United States Patent
Draper et al.

(10) Patent No.: US 6,610,434 B1
(45) Date of Patent: Aug. 26, 2003

(54) SEGREGATED EXHAUST SOFC GENERATOR WITH HIGH FUEL UTILIZATION CAPABILITY

(75) Inventors: Robert Draper, Pittsburgh, PA (US); Stephen E. Veyo, Murrysville, PA (US); Richard E. Kothmann, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 153 days.

(21) Appl. No.: 09/636,248

(22) Filed: Aug. 10, 2000

(51) Int. Cl.⁷ .................................................. H01M 8/10
(52) U.S. Cl. .............................. 429/30; 429/25; 429/38
(58) Field of Search ............................ 429/25, 30, 38

(56) References Cited

U.S. PATENT DOCUMENTS

| | | |
|---|---|---|
| 4,395,468 A | 7/1983 | Isenberg |
| 4,664,986 A | 5/1987 | Draper et al. |
| 4,751,151 A | 6/1988 | Healy et al. |
| 5,047,299 A * | 9/1991 | Shockling ............ 429/20 |
| 5,064,733 A | 11/1991 | Krist et al. |
| 5,134,043 A | 7/1992 | Nakazawa |
| 5,573,867 A * | 11/1996 | Zafred et al. ............ 429/17 |
| 5,712,055 A | 1/1998 | Khandkar et al. |
| 5,733,675 A | 3/1998 | Dederer et al. |
| 5,866,090 A | 2/1999 | Nakagawa et al. |
| 5,928,806 A | 7/1999 | Olah et al. |
| 6,033,794 A | 3/2000 | George et al. |

FOREIGN PATENT DOCUMENTS

| | | |
|---|---|---|
| DE | 4319411 | 12/1994 |
| DE | 19611591 | 9/1997 |
| EP | 0482222 | 4/1992 |
| EP | WO 0026983 | 5/2000 |
| JP | 04000108 | 1/1992 |
| JP | 000268832 | 9/1992 |
| JP | 05003046 | 1/1993 |

* cited by examiner

*Primary Examiner*—Carol Chaney
*Assistant Examiner*—Dah-Wei Yuan

(57) ABSTRACT

A fuel cell generator contains a plurality of fuel cells (6) in a generator chamber (1) and also contains a depleted fuel reactor or a fuel depletion chamber (2) where oxidant (24,25) and fuel (81) is fed to the generator chamber (1) and the depleted fuel reactor chamber (2), where both fuel and oxidant react, and where all oxidant and fuel passages are separate and do not communicate with each other, so that fuel and oxidant in whatever form do not mix and where a depleted fuel exit (23) is provided for exiting a product gas (19) which consists essentially of carbon dioxide and water for further treatment so that carbon dioxide can be separated and is not vented to the atmosphere.

25 Claims, 5 Drawing Sheets

SEGREGATED EXHAUST SOFC GENERATOR WITH HIGH FUEL UTILIZATION CAPABILITY

GOVERNMENT CONTRACT

The Government of the United States of America has rights in this invention pursuant to Contract No. DE-AC26-98FT40355, awarded by the United States Department of Energy.

BACKGROUND OF THE INVENTION

1. Field of the Invention

The present invention relates to high temperature fuel cell generators and secondary fuel depletion means, wherein depleted fuel and depleted air are kept separate from each other to allow treatment of depleted fuel by a special apparatus to generate and capture essentially pure carbon dioxide, thereby precluding the release of greenhouse gas to the environment.

2. Background Information

Tubular, solid oxide electrolyte fuel cell SOFC generators have been well known in the art for almost twenty years, and taught, for example by A.O. Isenberg in U.S. Pat. No. 4,395,468. There, in the main embodiment, oxygen (as present in air), as oxidant, was reacted at the inside "air" electrode of a closed tubular SOFC, to yield depleted air; and fuel, such as CO and $H_2$, was reacted at an outside "fuel" electrode of the closed tubular SOFC to yield depleted fuel, all in a "generating chamber," at high temperatures (that is, about 1000° C.). The air electrode generally comprised a doped lanthanum manganite, the fuel electrode generally comprised a nickel cermet and an electrolyte disposed between the electrodes generally comprised a stabilized zirconia. The depleted air and depleted fuel were subsequently completely combusted in a separate, but attached preheating chamber, to preheat feed air. This basic SOFC generator design was carried forward, with other improvements, as shown for example in U.S. Pat. Nos. 4,664,986; 5,573,867; and 5,733,675 (Draper et al.; Zafred et al.; and Dederer et al.). Other designs have used a series of fuel cell stacks, each providing a stage containing a different electrolyte operating at a lower temperature to improve fuel gas utilization, as taught in U.S. Pat. No. 5,712,055 (Khandkar). In a somewhat similar fashion, in one embodiment of U.S. Pat. No. 5,134,043 (Nakagawa), "depleted fuel" from a molter carbonate fuel cell system is sent to a separate molten carbonate anode, where the product was then mixed/contacted with oxidant/air before being introduced into the cathode section of the first molten carbonate electrolyte fuel cell. While tubular fuel cells are emphasized herein, flat/planar fuel cells, which are well known in the art, may also be used.

However, such designs could release byproducts of combustion, such as carbon dioxide into the atmosphere. Efforts are now being made on an international level to globally reduce the release of so-called "green house gases" which includes carbon dioxide, which may contribute to global atmospheric warming. Such efforts may, indeed, lead to future legislation regarding carbon dioxide emissions from SOFCs. What is needed is a means to further treat the spent fuel from fuel cell generators to not only reduce or eliminate carbon dioxide emissions, but also to increase the capacity of the fuel cell generators to further utilize feed fuel, thereby producing more electricity. Such a need applies to both tubular and flat plate type fuel cells.

In the area of reducing carbon dioxide emissions from power plants utilizing a variety of types of fuel cells, in order to reduce the "green house effect", U.S. Pat. No. 4,751,151 (Healy et al.) taught a carbon dioxide absorber, such as monoethanolamine, including a regenerable absorbent, for stripping carbon dioxide followed by subsequent cooling and compression. In U.S. Pat. No. 5,064,733 (Krist et al.), recognizing prior art conversion of natural gas into carbon dioxide and water—with the accompanying creation of a DC electrical current—in a solid oxide fuel cell, taught conversion of the carbon dioxide and water to $C_2H_4$, $C_2H_6$ and $C_2H_2$ by use of a copper, copper alloy or perovskite cathode. That cathode was in contact with the $CO_2$, and $H_2O$ and a dual layered anode made of metallic oxide perovskite next to the electrode with an outer contacting layer of rare earth metallic oxide contacting $CH_4$. This provided for concurrent gas phase electrocatalytic oxidative dimerization of methane at an anode on one side of a solid electrolyte and reduction of carbon dioxide to gaseous hydrocarbons at a cathode on the other side of the solid electrolyte. Other $CO_2$ treatments include U.S. Pat. No. 5,928,806 (Olah et al.), where a regenerative fuel cell system containing two electrochemical cells in fluid communication were taught, one cell oxidizing an oxygenated hydrocarbon, such as methyl alcohcl, formic acid, etc., to $CO_2$ and $H_2O$ and a second cell reducing $CO_2$ and $H_2O$ to an oxygenated hydrocarbon. This produced methyl alcohol and related oxygenates directly from $CO_2$. Also, U.S. Pat. No. 5,866,090, (Nakagaua et al.) taught treating carbon dioxide effluent, from an energy plant which uses fuel cells, with lithium zirconia at over 450° C., to produce lithium carbonate and zirconia.

While a great many methods to treat carbon dioxide are known, a new fuel cell generator design is needed to allow segregation of the carbon dioxide for such treatment.

SUMMARY OF THE INVENTION

Therefore it is a main object of this invention to yield an improved fuel cell generator design, allowing segregation of carbon dioxide generated at the fuel electrodes.

It is a further object of this invention to yield an improved Generator design allowing ultra high fuel utilization.

These and other objects are accomplished by providing a high temperature fuel cell generator comprising a separate generator chamber containing tubular solid oxide electrolyte fuel cells, which operate on oxidant and fuel to yield depleted oxygen and depleted fuel, and a separate depleted fuel reactor chamber containing a depleted fuel reactor and operating at a potentially different temperature than the generator chamber, where all oxidant and fuel passages are separated and do not communicate directly with one another, so that fuel and oxidant remain effectively separated, and where a depleted fuel exit is provided in the depleted fuel reactor chamber for exiting a gas consisting essentially of carbon dioxide and water for further treatment, and where at least one exit is provided for depleted oxidant to exhaust to the environment.

The invention also comprises a high temperature fuel cell generator, comprising: a housing defining and separating a generator chamber, a separate depleted fuel reactor chamber, and a depleted oxidant discharge chamber; a plurality of fuel cells, each having an electrolyte contacted on one side by an air electrode and on the other side by a fuel electrode said fuel cells disposed within the generator chamber; a depleted fuel reactor disposed in the depleted fuel reactor chamber; means to flow a feed fuel gas to contact the fuel electrode of fuel cells in the generator chamber, where said fuel can react and yield partially depleted fuel gas; means to flow a feed oxidant gas to contact the air electrode of fuel cells in the generator chamber, where said oxidant can react and yield a depleted oxidant gas; means to flow partially depleted fuel gas from the generator chamber to contact the depleted fuel reactor in the depleted fuel reactor chamber, where said depleted fuel can further react and yield a completely depleted fuel gas consisting essentially of carbon dioxide and water; and means to flow oxidant gases to the depleted fuel reactor chamber to contact the depleted fuel reactor, in order to deplete fuel to near or total completion; where depleted oxidant gases are kept separated from all depleted fuel gases and said depleted oxidant gases for the generator chamber and the depleted fuel reactor chamber flow into at least one separate depleted oxidant exit.

The invention also covers a method of operating a high temperature fuel cell generator comprising a separate generator chamber, and a separate depleted fuel reactor chamber, containing a depleted fuel reactor, with at least the generator chamber containing solid oxide fuel cells containing a solid electrolyte disposed between an air electrode and a fuel electrode which operate on oxidant and fuel gases, comprising the steps: (1) feeding feed fuel gas to contact fuel electrodes of fuel cells in the generator chamber to yield partially depleted fuel gas; (2) feeding partially depleted fuel gas to contact the depleted fuel reactor to yield almost completely depleted fuel gas consisting essentially of carbon dioxide and water; and (3) feeding oxidant gas to contact air electrodes of fuel cells in the generator chamber to yield depleted oxidant gas; where depleted oxidant gases are kept separated from all depleted fuel gases and said depleted oxidant gases flow into a separate depleted oxidant discharge chamber. In the operation of this generator, the depleted fuel reactor chamber may be operated at a temperature different than that of the generator chamber.

Thus, this invention relates to an arrangement of components within an fuel cell generator by means of which the exhausted $CO_2$ and $H_2O$ are segregated from exhausted vitiated air. By this means water can be condensed from the product exhaust stream, and the carbon dioxide can be pressurized or liquefied and put to use, rather than being released to the atmosphere. Consequently the release of a "green house gas" pollutant is avoided. The main idea is to produce electric power and sequester carbon dioxide. In addition to the main generating section, the arrangement allows that the fuel depletion means, a depleted fuel reactor, can be a second set of power producing fuel cells designed to operate at very high fuel utilization without the normally attendant problem of oxidation of the fuel electrodes. In the arrangement of this invention the main generator chamber and the depleted fuel reactor chamber are conveniently integrated within a common enclosure. The common enclosure also contains a steam plenum, as well as stack reformer passages positioned between the fuel cells in the generating chamber.

Also included as part of the invention is a fuel cell generator where a barrier is interposed between a spent fuel plenum and vitiated air plena, preventing the migration of depleted fuel into vitiated air (or vitiated air into depleted fuel). The fuel cell generator also includes means to re-circulate depleted fuel and mix it with fresh fuel by use of an ejector pump, a mechanical pump, or other means of forcing circulation. Preferably, the generator chamber and the depleted fuel reactor chamber are maintained at different temperature levels through the regulation of the following parameters: air flow rate, air inlet temperature, fuel flow rate, and electric current drawn from the fuel cells.

The fuel cell generator advantageously can have fuel cells used in the generator chamber and in the depleted fuel reactor chamber, constructed using different anode materials (for example, nickel anodes in the generator chamber and copper anodes in the depleted fuel reactor chamber), with the temperatures in the respective chambers controlled to appropriate levels (for example, 1000° C. in the generator chamber and 800° C. in the depleted fuel reactor chamber) through separate—but coordinated—regulation of the following parameters: air flow rate and/or air temperature at inlet to the generator chamber and the depleted fuel reactor chamber. Additionally, one possible design includes having the generator chamber and the depleted fuel reactor chamber separated, and not in the same exterior housing, but in physically separate enclosures suitably connected by piping.

Also included as part if this invention is a method of operating a fuel cell generator where the fuel cells in the depleted fuel reactor are effectively short circuited by means of a shorting conducting path or by means of an electrolyte with electronic as well as ionic conductivity, with the fuel utilization within the generator chamber modulated and/or the temperature of the depleted fuel reaction chamber modulated via a control system in conjunction with an oxygen sensor at the depleted fuel reactor's exit, to monitor exit oxygen partial pressure and/or the measurement of the voltage of depleted fuel reactor chamber's cells so as to preclude oxidating of depleted fuel reactor chamber cell anodes. Additionally, in the method, the cell voltages of the fuel cells in the depleted fuel reactor are monitored with this information used by a control system to modulate the depleted fuel reaction chamber fuel cell current to avoid anode oxidation.

BRIEF DESCRIPTION OF THE DRAWINGS

For a better understanding of the invention, reference may be made to the exemplary embodiments shown in the accompanying drawings, in which.

DESCRIPTION OF THE PREFERRED EMBODIMENTS

Figure 1:
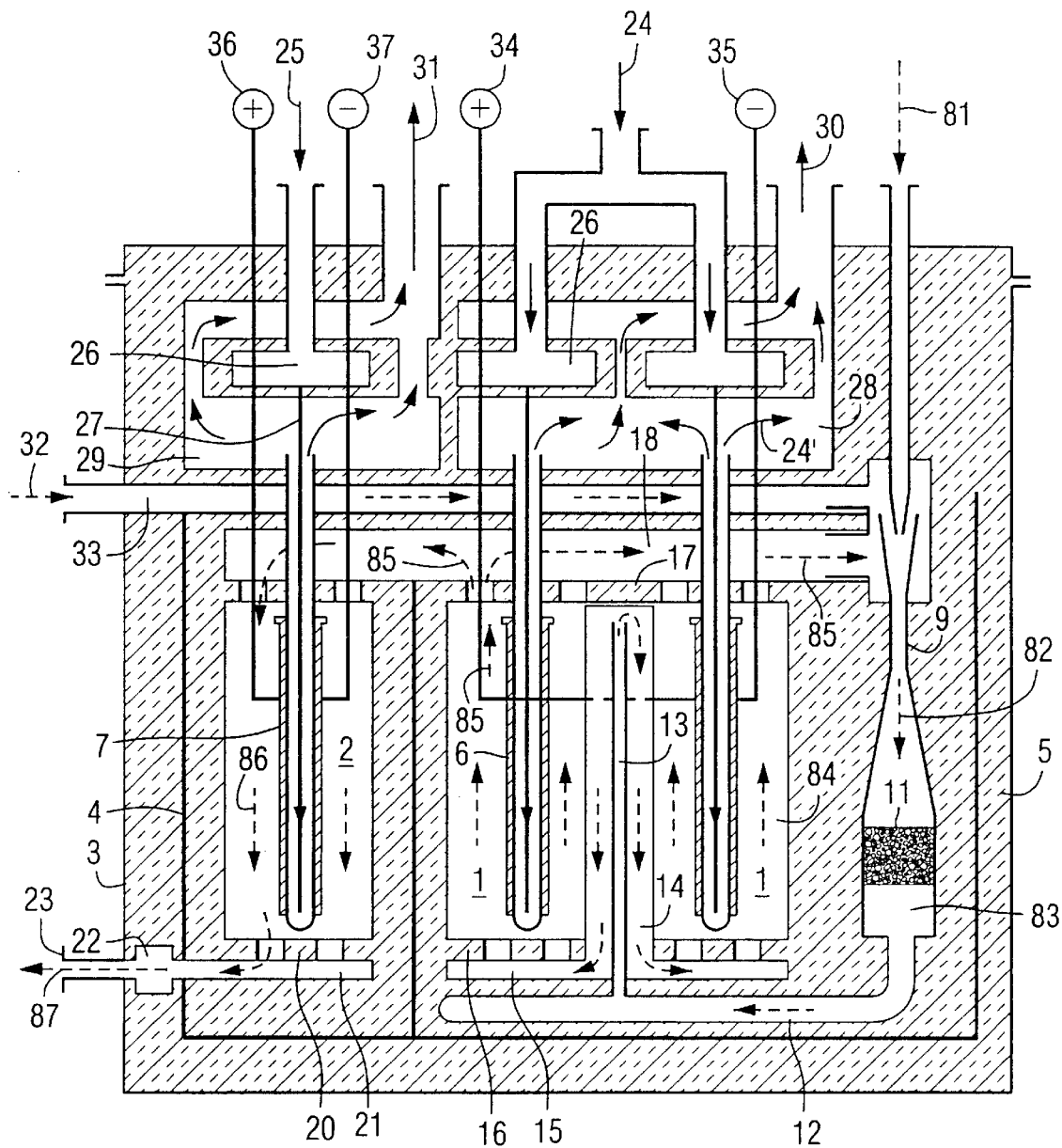
FIG. 1 is a sectional view of a segregated exhaust SOFC generator with integral secondary fuel depletion means, here shown as another set of fuel cells, showing gas flow paths.

Referring now to FIG. 1, a fuel cell electrical power generator chamber/section 1 and a depleted fuel reactor (fuel depletion) chamber/section 2, which can also produce power, comprise the high temperature fuel cell generator, housed within a typical outer metal enclosure 3. Typically, section 1 will operate at temperatures greater than 800° C., usually between 900° C. and 1100° C. Within the enclosure, these two sections are separated and separately enveloped by high temperature alloy metal liners 4 which prevent the migration of fuel gas, shown here for the sake of clarity as dashed (discontinuous) arrows, from one section to the other and from both sections to the thermal insulation 5 which fills the space between these sections and the common outer enclosure 3. Within the generator section 1, a plurality of fuel cells, preferably SOFCs, shown here in tubular form as 6, usually with nickel cermet (nickel particles embedded in a zirconia skeleton) external fuel electrodes (anodes) and interior doped lanthanum manganite air electrodes (cathodes), are contacted at their anodes by a gaseous fuel, such as a mixture of CO and $H_2$ (resulting from the reformation of $CH_4$, $C_2H_6$ and the like), and at their cathodes by an oxidant, usually air. Fuel utilization within generator section 1 typically reaches about 85%, after accounting for depleted fuel recirculation so that subsequently the fuel utilization in section 2 will be over 85%. By "fuel utilization" is meant the amount of electrochemical conversion of fuel fed into a section of the fuel cell generator to $CO_2$ and $H_2O$. Therefore, the depleted fuel composition at the top of the fuel cells 6, active portion consists of about 15 mass % to 30 mass % unreacted fuel (CO and $H_2$), with the balance having been reacted electrochemically to $CO_2$ and $H_2O$ by the fuel cell in the process of generating electricity. This 70 mass % to 85 mass % depleted fuel 85 would be further reacted in section 2 by any appropriate depleted fuel reactor means to more fully deplete the fuel 87, yielding about 99 mass % final conversion to $CO_2$ and $H_2O$.

Fuel gas 84, represented by dashed arrows, flows in a re-circulated upflow mode within the main generator section 1 and achieves its maximum utilization level 85 at the top of the cells 6. At this point a fraction (approximately ⅓) of the depleted fuel flow 85 (determined by the amount of fresh fuel entering the re-circulation loop and the design value for the ratio of $O_2$ to C(>2)) is drawn off the loop and enters depleted fuel reactor section 2. Within section 2, the depleted fuel 85 flows, as shown in one embodiment, in a downward once through mode over a depleted fuel reactor, here a plurality of SOFCs 7 to become further-depleted fuel 86. Fuel utilization within section 2 extends from nominally 85% at inlet to a typical target value between 98% and 99% at exit. Thus, depleted flow 85 in section 2, already preferably about 85% depleted, will further react to exit at 22 and 23 as about 99% utilized depleted fuel 86. The feed fuel gas stream 81 yields the motive gas for an ejector pump 9, which inducts a fraction of the partially depleted fuel stream 85, and passes the mixture 82 (which is a mixture of 81 and 85) to a pre-reformer 11. Preferably, from the pre-reformer the gas (now designated 83) passes through feed flow pipes 12 each of which serve a multiplicity of riser tubes 13 within stack reformer passages 14.

Rows of stack reformer passages can be positioned between rows of SOFCs as shown. Additional stack reformers can flank the outer rows of cells. Reformer passages contain a distributed ceramic which is impregnated with a suitable reforming catalyst. An outer envelope of nickel foil (not specifically shown) prevents escape of the gas as it flows downward through the reformer passage. At the bottom the reformers discharge to a reformed fuel flow inlet plenum 15 whereupon the fuel 84 rises through a perforated entry baffle 16 before rising over the exterior of the cells in the main generator section 1. At the top of the cell stack the now depleted fuel 85 flows through a perforated exit flow manifold board 17 and enters the partially depleted fuel plenum 18. Within this plenum the flow divides, with the major fraction being inducted into the re-circulation loop to pass to the pre-reformer 11 as described above, and a minor fraction being passed to section 2 as depleted fuel 85.

At the bottom of section 2, the products 87 flow through a perforated exhaust baffle 20 before entering a multiplicity of exhaust channels 21, which join as exhaust manifold duct 22. Products leave the enclosure 3 through an exhaust nozzle 23. No reformer passages ordinarily exist in section 2. Thus, means 12, 16, etc. are provided to flow a feed fuel gas to contact the fuel electrode of fuel cells in the generator chamber where the fuel can react and yield partially depleted fuel gas which passes through exit baffle 17. The partially depleted fuel flows to either the depleted fuel reactor section 2 or the pre-reformer 11. There is no direct contact of the fuel, in any form, with air or oxidant, hence no combustion.

Separate air streams 24 and 25 are provided for the embodiment shown, that is for the main generator and the depleted fuel reactor sections respectively. Within both sections the air enters feed headers 26 before descending through feed tubes 27, shown in FIG. 1 only as a single line, and then rising through the fuel cells 6 or 7 within the annulus formed by the cell I/D and the feed tube O/D. Vitiated, or oxygen depleted air 30 and 31 is discharged from the top open end of the cells into discharge plena 28 and 29 which are completely separated from the depleted fuel plenum 18 and which serve main generator section 1 and the shown depleted fuel reactor section 2 respectively. Separate exhaust nozzles pass the air exhaust from the enclosure to recuperative heat exchangers.

Figure 2:
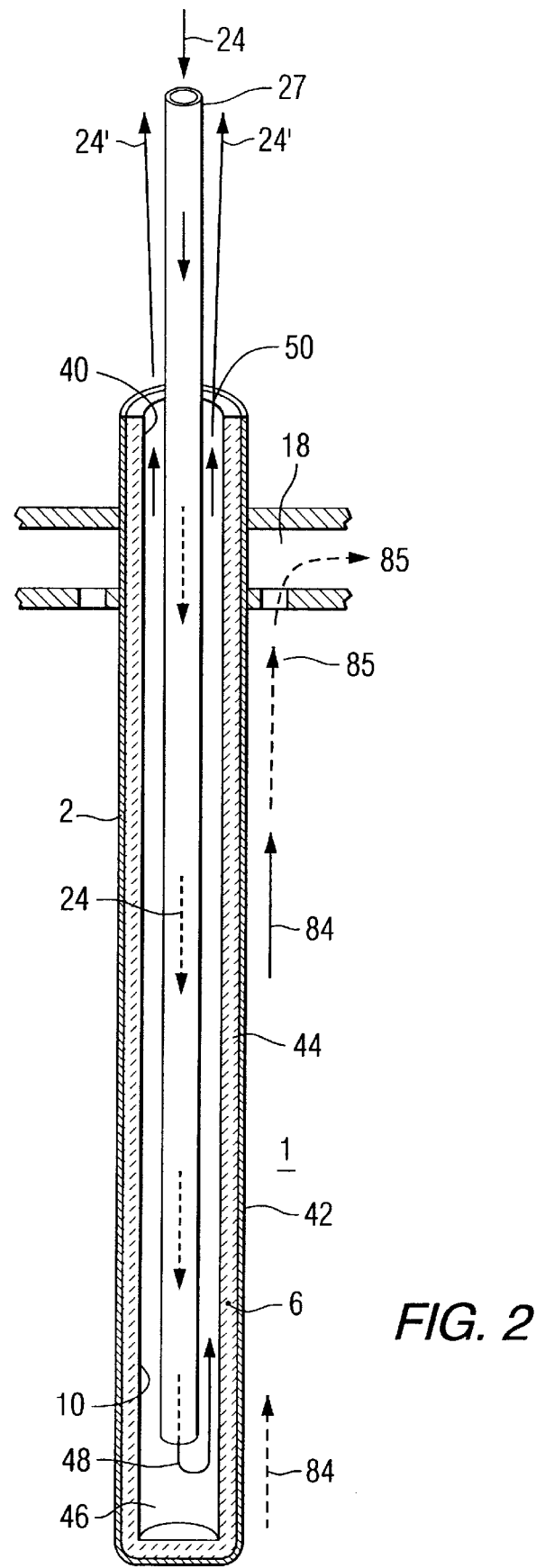
FIG. 2 is a detailed cross sectioned view of a fuel cell with associated oxidant feed inlet tube and depleted fuel gas exit plenum.

Referring now to FIG. 2, a more detailed view of tubular SOFC 6 is shown. The SOFC is shown as a tube having an air electrode 40 side, and a fuel electrode 42 side, with solid oxide electrolyte 44 disposed between the electrodes. The fuel 84 passes around the fuel electrode 42 becoming more depleted or spent as it exits at fuel plenum exit 18 where it is completely separated from oxidant air 24, which enters hollow air feed tube 27, passing down through the fuel cell until it reaches the bottom 46 of the tube, where the air reverses direction, as shown at 48, and reacts as it flows upward inside the tube at the air electrode 40, exiting at 50 in a vitiated state 24', ionic oxygen having traversed the electrolyte and oxidized fuel at the anode electrochemically. The operation of fuel depletion means in chamber 2, where fuel cells 7 are utilized, is substantially the same except fuel flows down the cell 7 and out exhaust 23 of FIG. 1. Thus, referring to FIGS. 1 and 2, means 26 and 27 allow a first feed oxidant gas 24 to flow to contact the air electrode of fuel cells 6 in the generator chamber 1 to yield a first depleted oxidant gas 30. Other means 26 and 27 allow a second feed oxidant gas 25 to flow to contact the air electrode of fuel cells 7 in the depleted fuel reactor section 2 to yield a second depleted oxidant gas 31. The finally depleted fuel at the bottom of chamber 2 consists of carbon dioxide, water and about 1% unreacted fuel which exits at 20 and 23 where it can be further processed to, for example condense water, providing essentially pure segregated $CO_2$.

A stream of steam 32 can be utilized to flow horizontally through a barrier plenum 33 which can be sandwiched between the depleted fuel re-circulation plenum and the vitiated air exhaust plenum thereby, separating the two. Steam is permitted to leak through the small annular clearances between the baffles which form the plena and the cell outer diameter. By this means the mixing of depleted fuel with exhausting air is prevented. Steam which leaks into the exhaust air plenum is wasted, while that which leaks into the fuel side is in part used in the fuel reformation process at 11 and can be recovered in an external condenser. No fuel interacts with the oxidant in this design. Power leads 34 and 35 for the main generator section 1, and power leads 36 and 37 for section 2 connect to external loads. Within both main generator and fuel depletion section three parallel circuits (typically) negotiate a serpentine series path from low potential power lead to high potential power lead. The three circuits are parallel connected periodically in the series path. Also, a control means (not shown) can be used to regulate oxidant and fuel flows to prevent oxidation of the fuel electrodes associated with the fuel cells and to regulate fuel cell temperature. Further, an oxygen sensor at the depleted fuel exit 23 can be used to monitor the exit oxygen partial pressure and with suitable control, modulate current to avoid fuel cell 7 anode oxidation within the depleted fuel reactor (fuel depletion) section.

Figure 3:
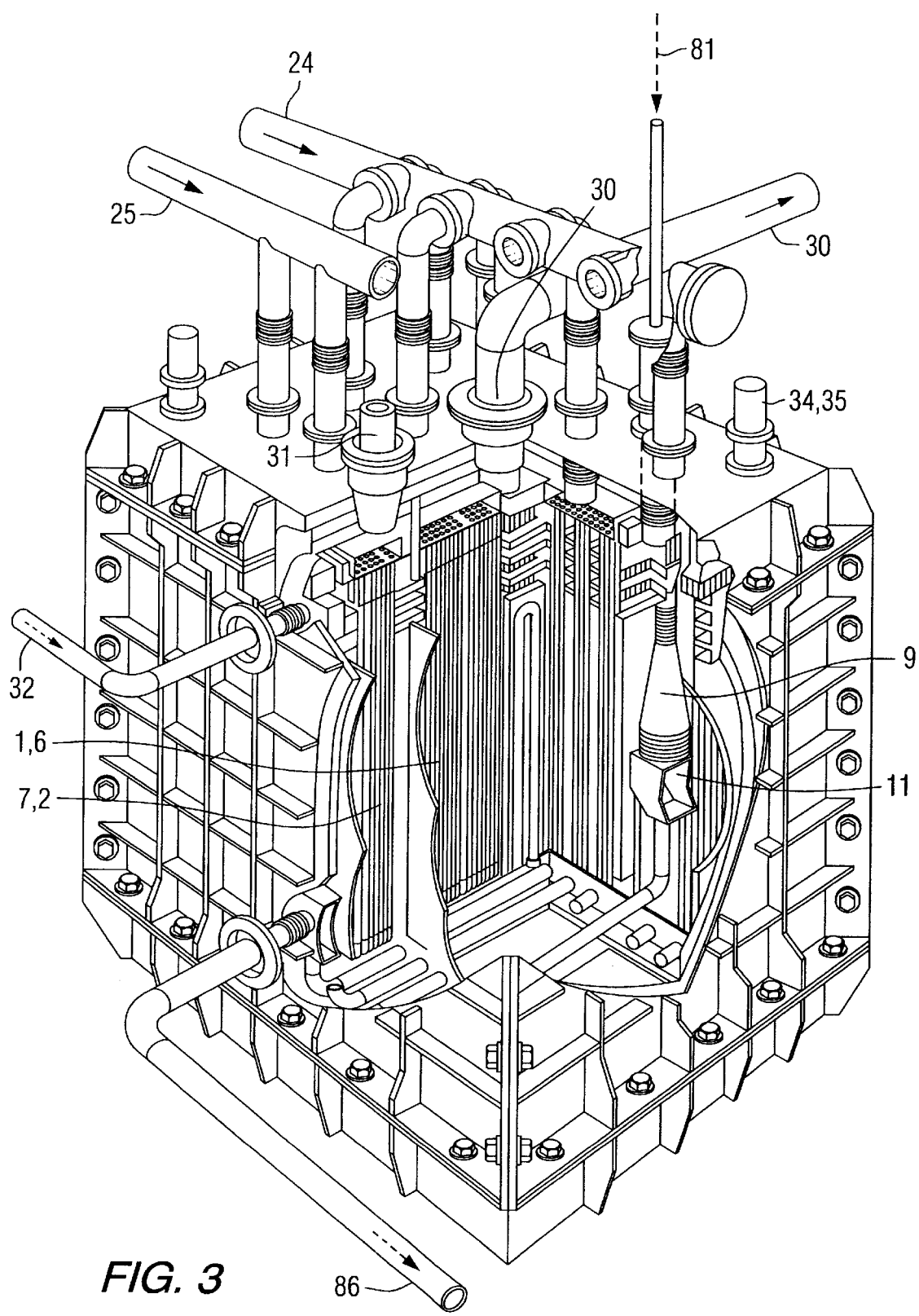
FIG. 3 is a cut-away, three dimensional, overall view of a SOFC generator showing some internal and external details.

FIG. 3 shows a cutaway view of the generator design of FIG. 1, where selected elements are labeled, providing an overall view of the generator. It is to be understood that flat plate geometries or other fuel cell types could be substituted for the tubular solid oxide electrolyte design which is described here for convenience.

In this design one must ensure that the oxygen partial pressure at the fuel electrode/electrolyte interface in the reactions:

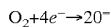

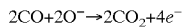

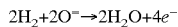

is low enough to preclude oxidation of the cell anodes in the depleted fuel reactor section. In one solution, nickel anode cells, like the main generator (Section 1) cells, could be used in the depleted fuel reactor section, but at very substantially reduced cell amperage. Alternatively, copper anode cells might be employed in the depleted fuel reactor section which, while operating at a current level less than that of the main generator (section 1), is reduced in amperage to a lessor extent than would be the case for nickel anode cells.

The separate supply of process air to the cells in the fuel depletion section ensures that the temperature therein can be managed appropriately.

The following non-limiting example is presented to further illustrate the invention.

EXAMPLE

Figure 4:
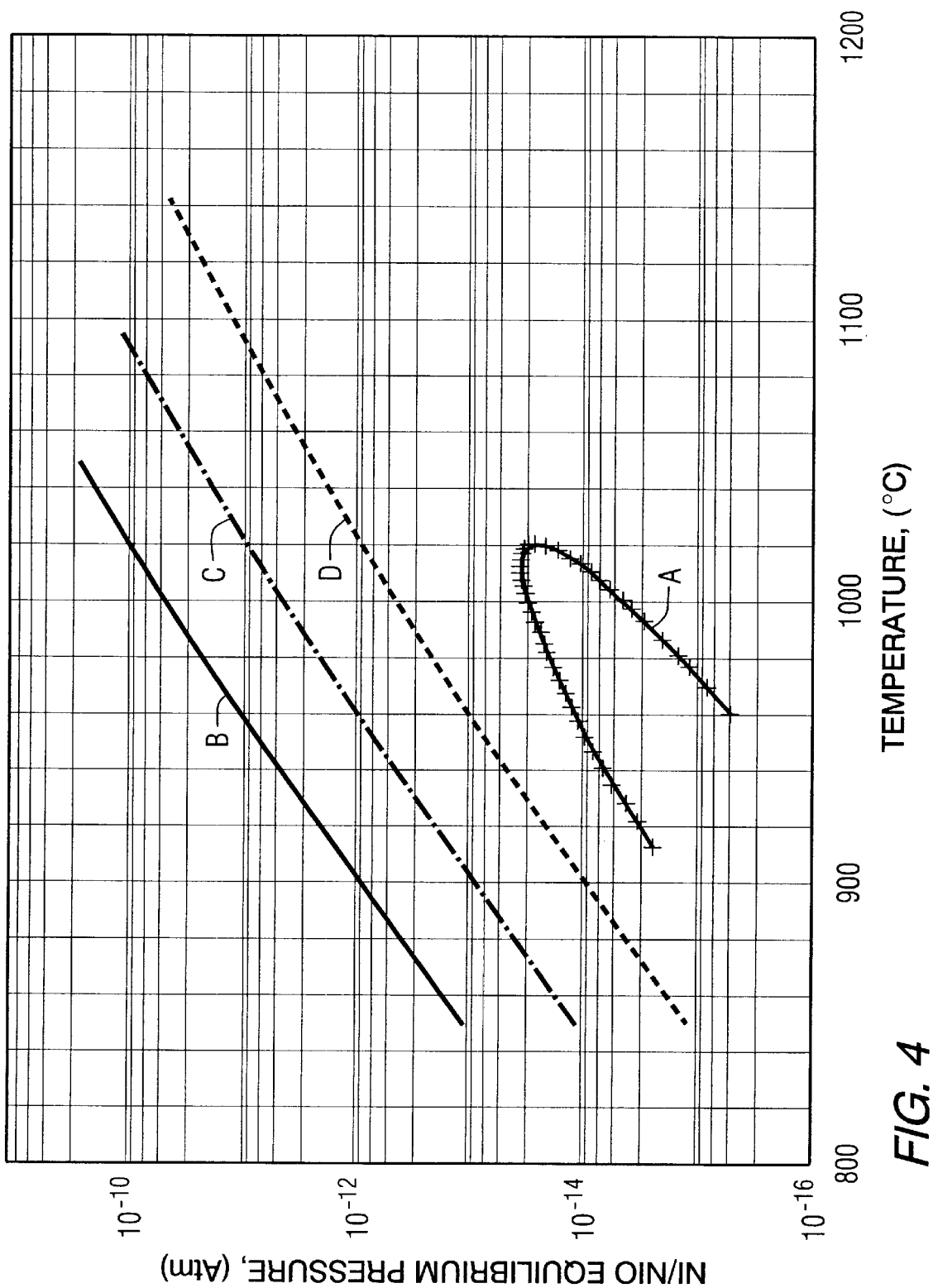
FIG. 4 is a graph showing a plot of the Ni/NiO equilibrium oxygen partial pressure in atmospheres versus fuel cell temperature, plus a plot of the partial pressure of oxygen at the anode/electrolyte interface for an operating nickel anode SOFC with an axial distribution of temperature.

A generator, somewhat similar to that shown in FIG. 1, was demonstrated, utilizing tubular SOFC having dimensions of 22 mm O.D. by 1500 mm active length, with an active area of 834 sq. cm. Within the main generator section, six tubular SOFCs with nickel anodes were operated at a per cell amperage of nominally 250 amp. At this condition oxygen partial pressure at the anode/electrolyte interface was at all positions safely below the level which would give rise to oxidation of the anode. FIG. 4 Curve A shows the relationship between the local oxygen partial pressure and temperature along the length of a cell operating at 253 amp with troll fuel gas [methane=93.88%, ethane=3.47%, pentane=0.17%, $CO_2$=0.3%, propane=0.45%, butane= 0.47% and $H_2$=1.26%] at 85% utilization. The Figure shows that oxygen partial pressure is always two orders of magnitude below the level which would lead to oxidation of the nickel anode. Curve B of FIG. 4 shows the equilibrium partial pressure for nickel oxidation as a function of temperature. Curve C of FIG. 4 shows one tenth of the equilibrium partial pressure for nickel oxidation as a function of temperature. Curve D of FIG. 4 shows one hundredth of the equilibrium partial pressure for nickel oxidation as a function of temperature. Optimization of the design might lead to a maximum fuel utilization within the main generator section which is higher than the 85% level cited above.

Figure 5:
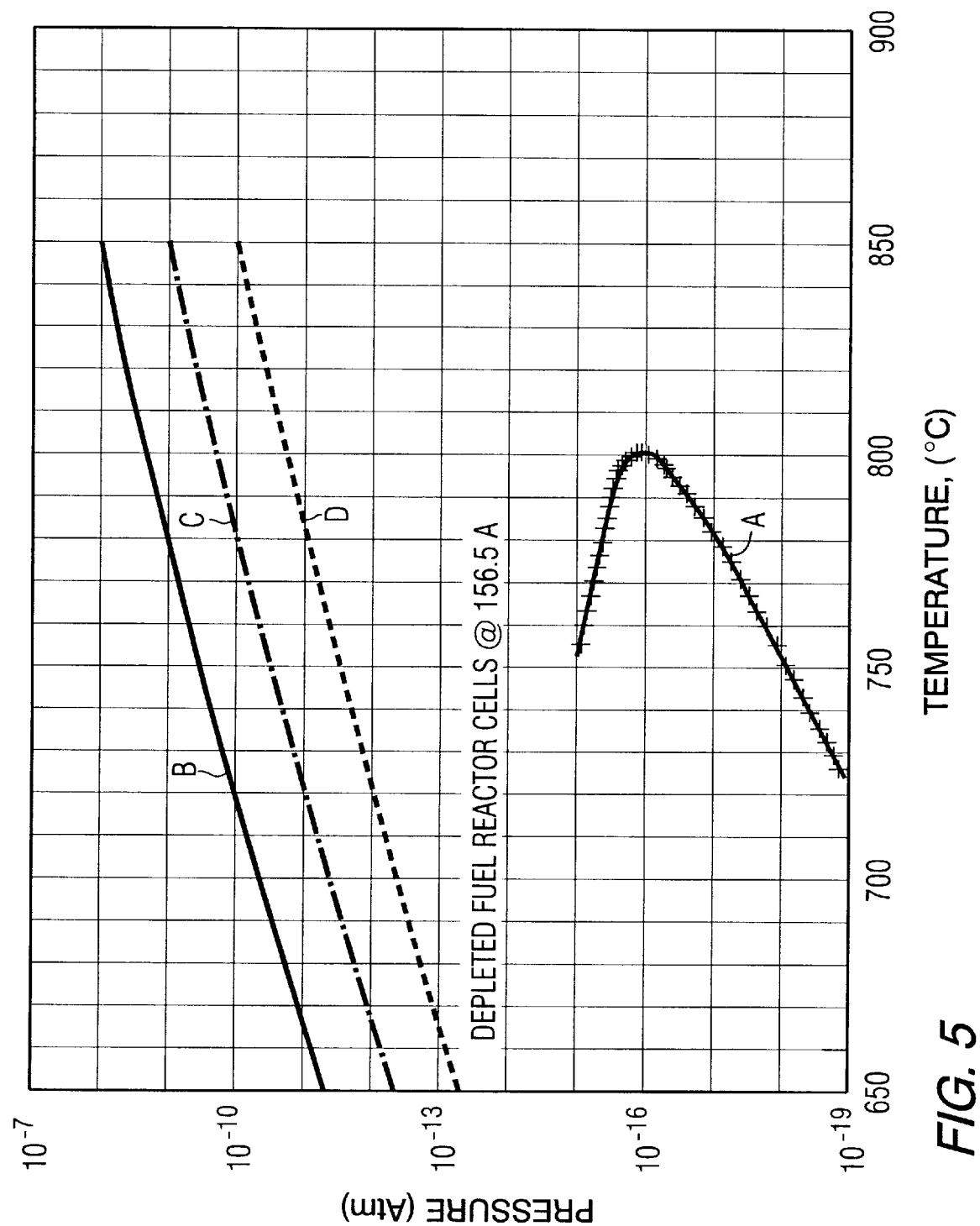
FIG. 5 is a graph showing the relationship between oxygen partial pressure in atmospheres versus fuel cell temperature for a fuel cell using a copper electrode and operating at 156.5 amps with fuel gas.

In the secondary fuel depletion section, fuel utilization will achieve a maximum value in the range between 95% and 99%. In this range the margin of safety regarding oxidation of the fuel electrode shown by FIG. 4 (pertaining to 85% utilization and 253 amp/cell) does not exist. Among the options available to restore the margin of safety are, a dramatic reduction in cell amperage or a change in fuel electrode material. FIG. 5 curve A shows the relationship between oxygen partial pressure and temperature for a cell using a copper anode operating at 156.5 amp with troll fuel gas. The figure shows that the partial pressure is always two orders of magnitude below the level which would lead to oxidation of the copper anode. Curve B of FIG. 5 shows the equilibrium partial pressure for copper oxidation as a function of temperature. Curve C of FIG. 5 shows one tenth of the equilibrium partial pressure for copper oxidation as a function of temperature. Curve D of FIG. 5 shows one one-hundredth of the equilibrium partial pressure for copper oxidation as a function of temperature.

The present invention may be embodied in other forms without departing from the spirit or essential attributes thereof, and accordingly, reference should be made to both the appended claims, and to the foregoing specification as indicting the scope of the invention.

What is claimed is:

1. A high temperature fuel cell generator operating at over 800° C. with feed fuel and feed oxidant, said fuel cell generator comprising a separate generator chamber containing tubular solid oxide electrolyte fuel cells, which operate on oxidant and fuel to yield depleted oxidant and depleted fuel, and a separate depleted fuel reactor chamber containing depleted fuel reactor and operating at a different temperature than the generator chamber, where all oxidant and fuel passages are separated and do not communicate directly with each other, so that depleted fuel and depleted oxidant remain separated, where a depleted fuel exit is provided in the depleted fuel reactor chamber for exiting a gas consisting essentially of carbon dioxide and water for further treatment, where at least one exit is provided for depleted oxidant to exhaust to the environment, where the depleted fuel reactor chamber operates at a fuel utilization of over 85%, and where the fuel cell generator operates to produce electric power and sequester carbon dioxide.

2. The fuel cell generator of claim 1, where a barrier is used as a means to keep depleted fuel and depleted oxidant separated.

3. The fuel cell generator of claim 1, where tubular fuel cells are used as the means to deplete fuel in the depleted fuel reactor chamber, with an oxygen sensor at the depleted fuel cell exit to monitor oxygen concentration and through control means modulate depleted fuel reactor chamber fuel cell current to avoid fuel cell anode oxidation.

4. The fuel cell generator of claim 1, operating on pressurized oxidant and fuel.

5. A high temperature fuel cell generator, comprising:
   (1) a housing defining and separating a generator chamber, a separate depleted fuel reactor chamber and a depleted oxidant discharge chamber;
   (2) a plurality of fuel cells each having an electrolyte contacted on one side by an air electrode and on the other side by a fuel electrode said fuel cells disposed within the generator chamber;
   (2) a depleted fuel reactor disposed in the depleted fuel reactor chamber;
   (3) means to flow a feed fuel gas to contact the fuel electrode of fuel cells in the generator chamber, where said fuel can react and yield partially depleted fuel gas;
   (4) means to flow a feed oxidant gas to contact the air electrode of fuel cells in the generator chamber, where said oxidant can react and yield a depleted oxidant gas;

(5) means to flow partially depleted fuel gas from the generator chamber to contact the depleted fuel reactor in the depleted fuel reactor chamber, where said depleted fuel can further react and yield a completely depleted fuel gas consisting essentially of carbon dioxide and water; and (6) means to flow an oxidant gas to the depleted fuel reactor chamber to also contact the depleted fuel reactor in order to deplete fuel to near or total completion; where depleted oxidant gases are kept separated from all depleted fuel gases and said depleted oxidant gases for the generator chamber and the depleted fuel reactor chamber flow into at least one separate depleted oxidant exit, and where oxidant and fuel flow and electrical current can be regulated to prevent oxidation of fuel electrodes associated with the fuel cells.

6. The fuel cell generator of claim 5 where a barrier plenum is used as a means to keep depleted fuel and depleted oxidant separated.

7. The fuel cell generator of claim 5, having an associated condensing means to condense water so that the completely depleted fuel gas consists essentially of carbon dioxide.

8. The fuel cell generator of claim 5, having an associated condensing means to condense water so that the completely depleted fuel gas consists essentially of carbon dioxide, and where the generator has an associated liquefaction means to liquefy carbon dioxide.

9. The fuel cell generator of claim 5, also containing a means to pre-reform feed fuel gas, a feed steam inlet, means to flow feed steam to mix with partially depleted fuel gas from the generator chamber, and means to flow the mixture into the pre-reforming means.

10. The fuel cell generator of claim 5, when the fuel cells comprise planar or tubular electrolyte disposed between electrodes.

11. The fuel cell generator of claim 5, where fuel cells are used as the depleted fuel reactor in the depleted fuel reactor chamber and all the fuel cells are tubular, containing electrolyte disposed between a fuel electrode and an air electrolyte.

12. The fuel cell generator of claim 9, where the means to flow feed steam to mix with partially depleted fuel gas, also flows steam past feed oxidant gas flow means to allow heating the feed oxidant gas.

13. The fuel cell generator of claim 5, operating at over 800° C. with feed fuel and feed oxidant and tubular solid oxide electrolyte fuel cells in at least the generator chamber and where the depleted fuel reactor chamber operates at a fuel utilization of over 85%.

14. The fuel cell generator of claim 5, operating to produce electric power and sequester carbon dioxide.

15. The fuel cell generator of claim 5, with an oxygen sensor at the depleted fuel exit to monitor oxygen concentration and through control means modulate depleted fuel reactor chamber fuel cell current to avoid fuel cell anode oxidation.

16. The fuel cell generation of claim 5, operating on pressurized oxidant and fuel.

17. The fuel cell generator of claim 5, wherein a barrier plenum is interposed between the spent fuel plenum and the vitiated air plena, said barrier plenum being supplied with steam from an external source for the purpose of preventing the migration of depleted fuel into vitiated air, or vitiated air into depleted fuel, thus ensuring that combustion does not occur.

18. The fuel cell generator of claim 5, wherein the means to recirculate depleted fuel and mix it with fresh fuel consist of an ejector pump or a mechanical pump, or other means of forcing circulation.

19. The fuel cell generator of claim 5 wherein the generator chamber and the depleted fuel reactor chamber are maintained at different temperature levels through the regulation of the following parameters: air flow rate, air inlet temperature, fuel flow rate, and electric current drawn from the fuel cells.

20. The fuel cell generator of claim 5 wherein the fuel cells used in the generator chamber and in the depleted fuel reactor chamber are constructed using different anode materials—nickel anodes for the generator chamber and copper anodes for the depleted fuel reactor chamber—with the temperatures in the respective chambers controlled through regulation of the following parameters: control of the air flow rate and/or the air temperature(s) at inlet to the generator chamber and the depleted fuel reactor chamber; and/or the electrical current drawn independently from the glenerator chamber fuel cells and the depleted fuel reactor chamber fuel cells.

21. The fuel cell generator of claim 5 wherein the generator chamber and the depleted fuel reactor chamber are not in the same exterior housing, but in physically separate enclosures connected with piping.

22. A method of operating a high temperature fuel cell generator comprising a separate generator chamber, and a separate depleted fuel reactor chamber, containing a depleted fuel reactor, with at least the generator chamber containing solid oxide fuel cells containing a solid electrolyte disposed between an air electrode and a fuel electrode which operate on oxidant and furl gases, comprising the steps:

(1) feeding fuel gas to contact fuel electrodes of fuel cells in the generator chamber to yield partially depleted fuel gas;

(2) feeding partially depleted fuel gas to contact the depleted fuel reactor to yield almost completely depleted fuel gas consisting essentially of carbon dioxide and water; and (3) feeding oxidant gas to contact air electrodes of fuel cells in the generator chamber to yield depleted oxidant gas; where depleted oxidant gases are kept separated from all depleted fuel gases and said depleted oxidant gases flow into a separate depleted oxidant discharge chamber; and where an oxygen sensor is placed at a depleted fuel gas exit of the depleted fuel reactor chamber, said sensor monitoring oxygen partial pressure and the information used by a control system to modulate the depleted fuel reaction chamber fuel cell current to avoid fuel cell anode oxidation.

23. The method of claim 22, where the fuel cells are tubular, the water yielded in step (2) is condensed, providing essentially pure carbon dioxide which is not vented but is further processed, and where the depleted fuel reactor chamber operates utilizing fuel cells as the fuel depletion means, at a fuel utilization over 85%.

24. The method of claim 22, where the cell voltages of the fuel cells in the depleted fuel reactor are monitored, with the information used by a control system to modulate the depleted fuel reactor chamber fuel cell current to avoid anode oxidation.

25. The method of claim 22, where the fuel cells in the depleted fuel reactor are effectively short circuited by means of a shorting conducting path or by means of an electrolyte with electronic as well as ionic conductivity, with the fuel utilization within the generator chamber modulated and/or the temperature of the depleted fuel reaction chamber modulated via a control system in conjunction with an oxygen sensor at the depleted fuel reactor's exit, to monitor exit oxygen partial pressure and/or the measurement of the voltage of depleted fuel reactors chamber cells so as to preclude oxidation of depleted fuel reactor chamber's cells.

* * * * *